(No Model.)

W. C. KINARD & M. J. MADDOX.

PLOW.

No. 331,410. Patented Dec. 1, 1885.

WITNESSES:

INVENTORS:
Witt. Columbus Kinard.
Martin J. Maddox.
By their Attorneys, though>

UNITED STATES PATENT OFFICE.

WITT COLUMBUS KINARD AND MARTIN JACKSON MADDOX, OF TOWALIGA, GEORGIA.

PLOW.

SPECIFICATION forming part of Letters Patent No. 331,410, dated December 1, 1885.

Application filed June 12, 1885. Serial No. 168,502. (No model.)

*To all whom it may concern:*

Be it known that we, WITT C. KINARD and MARTIN J. MADDOX, citizens of the United States, residing at Towaliga, in the county of Butts and State of Georgia, have invented a new and useful Improvement in Plows, of which the following is a specification, reference being had to the accompanying drawings.

Our invention relates to an improvement in cultivators; and it consists in the peculiar construction and combination of devices, that will be hereinafter more fully set forth, and particularly pointed out in the claim.

Figure 1:
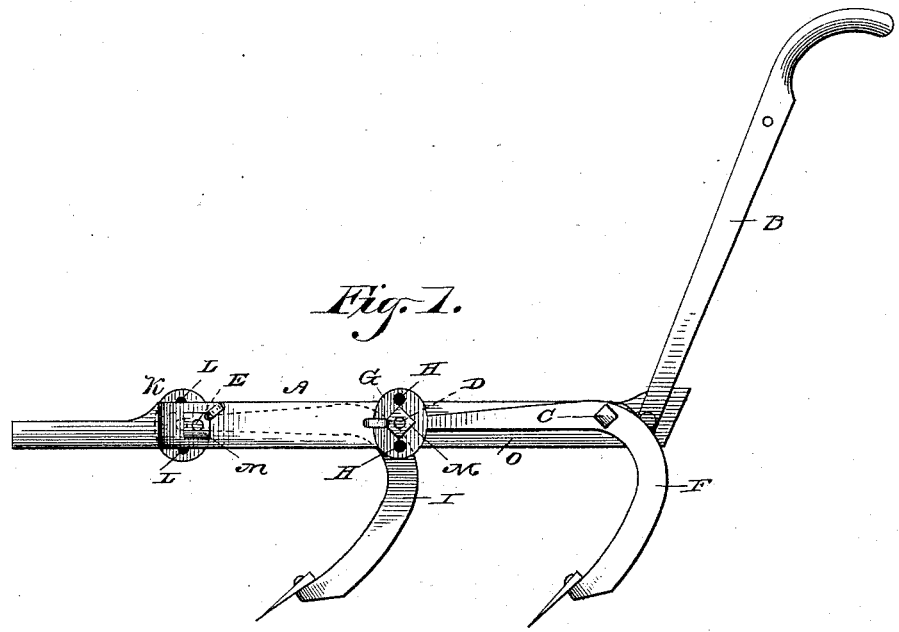
Figure 2:
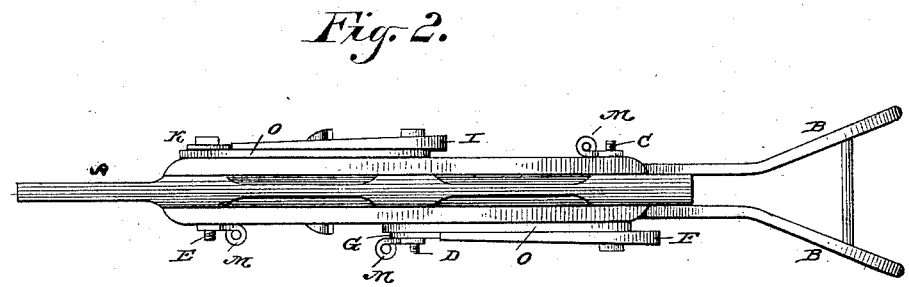
Figure 3:

In the accompanying drawings, Figure 1 is a side elevation of a cultivator embodying our invention. Fig. 2 is a top plan view of the same. Fig. 3 is a detail perspective view of one of the adjusting-keys.

A represents the beam of a cultivator, to the rear end of which are attached the handles B.

C, D, and E represent transverse bolts, which extend through the beam and are longer than the width thereof, so as to project laterally therefrom.

On one end of the bolt C is fulcrumed a plow-stock, F, to which is attached any desired form of tooth or cultivator. The front end of this stock is provided with an enlarged plate, G, having a series of openings, H, through one of which openings extends the outer end of the bolt D. On the opposite side of the beam, and fulcrumed on the bolt D, is another plow-stock, I, the extending end of which is provided with a plate, K, having perforations L, similar to those of the stock F. The bolt E passes through one of these perforations, and on the outer threaded end of each of the bolts is placed a thumb-nut, M. By means of this construction it will be readily understood that the plow-stocks may be secured firmly against the outer sides of the beam, and that by releasing the thumb-nuts on the securing-bolts the plow-stocks may be moved laterally away from the sides of the beam, so as to widen the space between them.

O represents keys, which are provided at their ends with open slots P, which are adapted to pass over the projecting ends of the bolts. When the plow-stocks are moved outwardly from the beam, one or more of these keys will be placed on the bolts between the plow-stocks and the beam, so as to secure the plow-stocks in their lateral adjustment. The thumb-nuts are then tightened on the ends of the bolts and clamp the keys firmly between the plow-stocks and the beam beyond the possibility of displacement.

A cultivator thus constructed is adapted to be adjusted laterally, so as to fit the plows for plowing rows of vegetables which are of varying distances apart, is light, cheap, and simple, and can be manufactured and sold at a low price.

By providing the ends of the plow-stocks with the perforated plates, which are secured on the ends of the transverse bolts, and by having the plow-stocks fulcrumed on the bolts, it will be readily understood that the plows may be adjusted vertically, so as to run in the ground at any desired angle.

We are aware that the arrangement of the beam and the standards on opposite sides thereof and placed one in advance of the other is not new, and this we disclaim, broadly; and we are also aware that means for adjusting the standards laterally with relation to the beam have been heretofore employed, and this also, broadly, we disclaim.

Having thus described our invention, we claim—

The combination of the beam having the transverse bolts C, D, and E, the plow-stock F, fulcrumed on one end of the bolt C and having the bolt D passed through its outer end, the plow-stock I, fulcrumed on the bolt D on the opposite side of the beam from the stock F, and having the bolt E passed through its outer end, the bolts being sufficiently long to permit lateral adjustment of the plow-stocks thereon, keys O, adapted to be inserted between the plow-stocks and the beam, and having slots P, to receive the shanks of the bolts, and the clamping-nuts M on the threaded ends of the bolts, substantially as described.

In testimony that we claim the foregoing as our own we have hereto affixed our signatures in presence of two witnesses.

WITT COLUMBUS KINARD.
MARTIN JACKSON MADDOX.

Witnesses:
L. D. WATSON,
JAMES F. CARMICHAEL.